United States Patent
Sakai

(10) Patent No.: US 9,440,541 B2
(45) Date of Patent: Sep. 13, 2016

(54) IN-VEHICLE CONTROL SYSTEM

(71) Applicant: DENSO CORPORATION, Kariya, Aichi-pref. (JP)

(72) Inventor: Naoto Sakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/667,815

(22) Filed: Mar. 25, 2015

(65) Prior Publication Data

US 2015/0329004 A1 Nov. 19, 2015

(30) Foreign Application Priority Data

May 19, 2014 (JP) ................................. 2014-103256

(51) Int. Cl.
*B60L 11/18* (2006.01)

(52) U.S. Cl.
CPC ............ *B60L 11/18* (2013.01); *B60L 11/1838* (2013.01); *B60L 11/1846* (2013.01)

(58) Field of Classification Search
CPC .. B60L 11/18; B60L 11/1838; B60L 11/1846
See application file for complete search history.

(56) References Cited

U.S. PATENT DOCUMENTS

| | | | | |
|---|---|---|---|---|
| 8,049,372 B2 * | 11/2011 | Newhouse | ............... | B60L 11/18 307/115 |
| 8,082,073 B2 * | 12/2011 | Okamura | ................ | B60L 11/18 180/65.21 |
| 9,156,365 B2 * | 10/2015 | Frey | .................... | B60L 11/1824 |
| 2007/0217404 A1 * | 9/2007 | Kawamata | ............. | H05B 37/02 370/360 |
| 2008/0291005 A1 | 11/2008 | Yukizane et al. | | |
| 2009/0212761 A1 * | 8/2009 | Ohta | ........................ | B60L 11/18 324/76.11 |
| 2011/0074214 A1 | 3/2011 | Takao et al. | | |
| 2013/0057213 A1 * | 3/2013 | Kuraishi | ............... | B60L 3/0046 320/109 |
| 2013/0212643 A1 * | 8/2013 | Takemura | ............... | G06F 21/31 726/2 |
| 2014/0203778 A1 * | 7/2014 | Ohnuki | ................... | B60L 11/18 320/109 |
| 2015/0123610 A1 * | 5/2015 | Zaki | ...................... | B60L 3/0046 320/109 |
| 2015/0123619 A1 * | 5/2015 | Marathe | ............. | B60L 11/1816 320/137 |
| 2015/0258908 A1 * | 9/2015 | Fukui | ........................ | B60L 3/00 320/162 |
| 2016/0049798 A1 * | 2/2016 | Maikawa | .................. | H02J 7/00 307/104 |

FOREIGN PATENT DOCUMENTS

| | | | |
|---|---|---|---|
| JP | 2006-139530 A | | 6/2006 |
| JP | 2009-111911 A | | 5/2009 |
| JP | 2009271086 A | * | 11/2009 |
| JP | 2010182239 A | * | 8/2010 |
| JP | 2011-239561 A | | 11/2011 |
| JP | 2012-249410 A | | 12/2012 |
| RU | 2313062 C1 | * | 12/2007 |

* cited by examiner

*Primary Examiner* — Tuan C. To
(74) *Attorney, Agent, or Firm* — Posz Law Group, PLC

(57) ABSTRACT

An in-vehicle control system is mounted in a vehicle, which is connectable with a charging station through a charging cable and provided with a battery chargeable from the charging station through the charging cable. The vehicle includes a double-wire type communication line provided with a charger-side terminal circuit. The in-vehicle control system includes a first communication line and a second communication line, which are connectable to the communication line of the charging cable and provided with three terminal circuits. The in-vehicle control system further includes a first ECU and a second ECU, which are connected to the first communication line and the second communication line. When a charging plug is connected to a charging port, the first ECU and the second ECU validate the first terminal circuit and invalidate the second terminal circuit and the third terminal circuit.

7 Claims, 11 Drawing Sheets

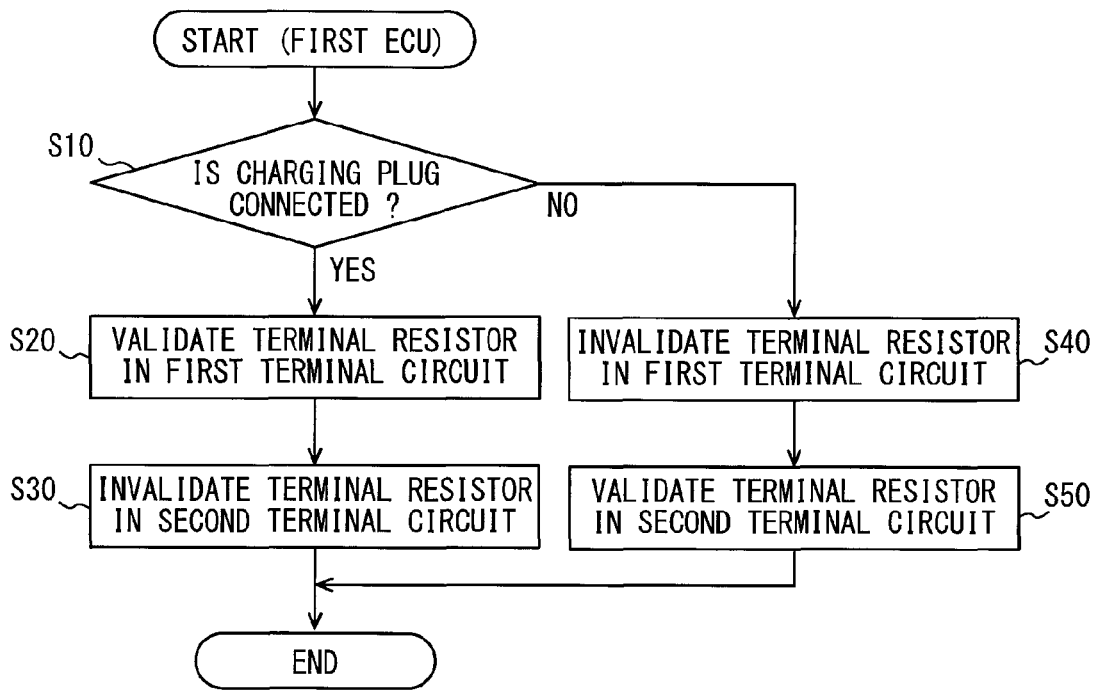
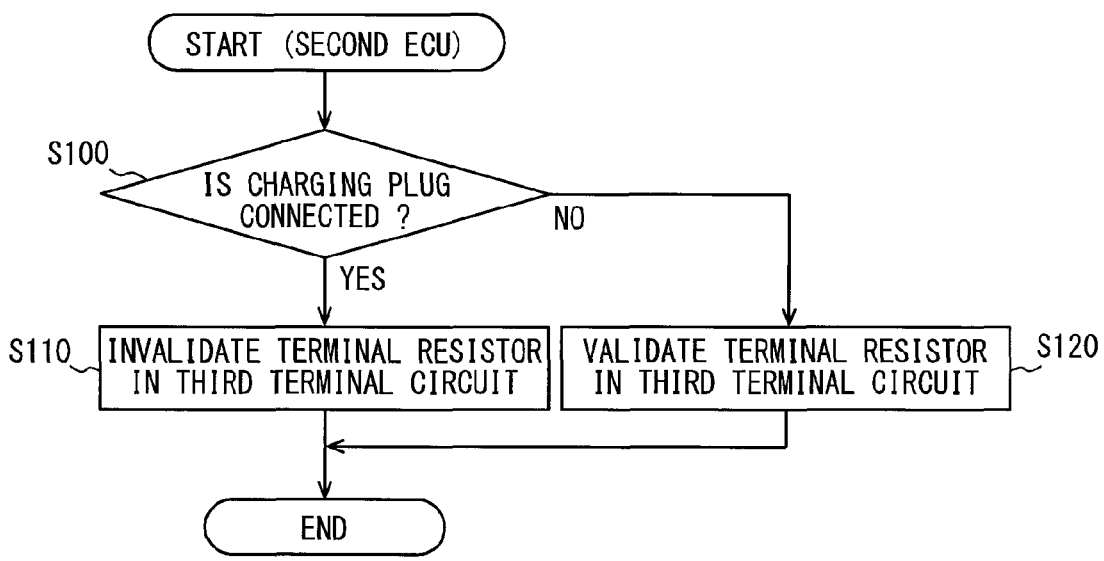

IN-VEHICLE CONTROL SYSTEM

CROSS REFERENCE TO RELATED APPLICATION

This application is based on Japanese patent application No. 2014-103256 filed on May 19, 2014, the content of which is incorporated herein by reference.

FIELD

The present disclosure relates to an in-vehicle control system, which has plural electronic devices including a charge-discharge control device capable of communication with a charging facility provided outside a vehicle.

BACKGROUND

Patent document JP 2012-249410A discloses one example of a conventional in-vehicle control system.

In the patent document, an electric power charger is used at a charging facility, a charging device is mounted in an electric vehicle and a charging cable is provided for connecting the charger and the charging device. The charger includes a charging circuit, a control circuit, a first communication circuit and the like. The charging device includes a battery 10, a second communication circuit, a control data setting circuit and the like. The charging cable includes therein a power cable and a communication cable. The power cable supplies a charging current outputted from the charging circuit to the battery 10. The communication cable communicates between the first communication circuit and the second communication circuit. This charging cable not only connects electrically the charging circuit and the battery 10 but also connects the first communication circuit and the second communication circuit to enable mutual communication therebetween.

Each of plural electronic devices generally communicates each other by way of a differential voltage method, which uses a double-wire type communication line having two terminal circuits. When the charging facility communicates with one of the plural electronic devices through the communication line, the communication cable in the charging cable is connected to the communication line. A connection of the communication cable to the communication line forms a network, in which at least one of the plural electronic devices is connected to the charger to be communicable mutually through the communication line. The charging facility preferably includes a terminal circuit to maintain quality of communication in a case of communication with one of the plural electronic devices through the communication line.

However, this network results in having three terminal circuits in a case of connection of the charging facility with the communication cable and tends to lower quality of communication between the charging facility and the electronic device or between the electronic devices.

SUMMARY

It is therefore an object to provide an in-vehicle control system, which is capable of communicating with a charging facility while maintaining quality of communication.

According to one aspect, an in-vehicle control system is mounted in a vehicle, which is connectable to a charging facility through a charging cable including a double-wire type facility-side communication line and a charging power cable connected with a facility-side terminal circuit and has a battery chargeable from the charging facility through the charging power cable. The in-vehicle control system comprises a double-wire type vehicle-side communication line, plural electronic devices and changeover members. The double-wire type vehicle-side communication line is connectable to the facility-side communication line and includes three vehicle-side terminal circuits. The plural electronic devices are connected to the vehicle-side communication line and capable of communication through the vehicle-side communication line by using a differential voltage, the plural electronic devices including a charging control device capable of communication with the charging facility through the vehicle-side communication line and the facility-side communication line by using the differential voltage. The changeover members are provided in correspondence to the three vehicle-side terminal circuits and individually validating and invalidating the three vehicle-side terminal circuits, respectively. The changeover members validate two of the three vehicle-side terminal circuits and invalidate a remaining one of the three vehicle-side terminal circuits, when the facility-side communication line is disconnected from the vehicle-side communication line. The changeover members validate one of the three vehicle-side terminal circuits and invalidate remaining two of the three vehicle-side terminal circuits, when the facility-side communication line is connected to the vehicle-side communication line.

BRIEF DESCRIPTION OF DRAWINGS

FIG. 5 is a flowchart showing a processing operation of a first ECU in the embodiment;

FIG. 6 is a flowchart showing a processing operation of a second ECU in the embodiment;

DETAILED DESCRIPTION OF EMBODIMENT

An in-vehicle control system will be described below with reference to one embodiment and its modified embodiments shown in the accompanying drawings. In each embodiment, same structures are designated with same reference symbols thereby simplifying the description.

Embodiment

Figure 1:
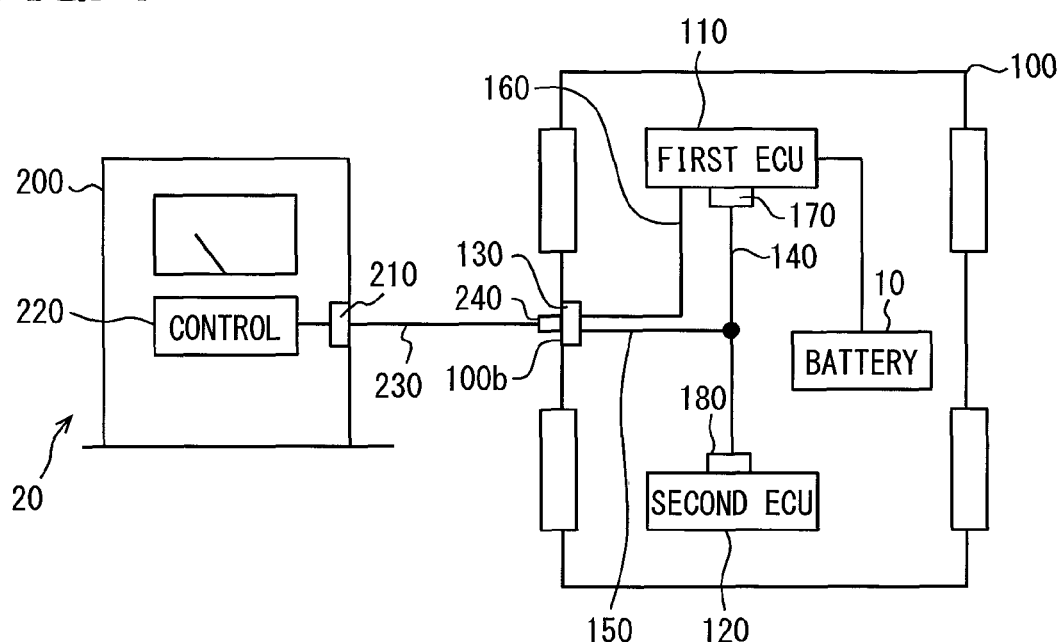
FIG. 1 is a block diagram showing generally an in-vehicle control system according to one embodiment.

Referring to FIG. 1, an in-vehicle control system according to one embodiment is mounted in a vehicle 100. The vehicle 100 is an electric vehicle, which is a plug-in hybrid type or driven solely by a driving motor without an engine. The vehicle 100 is connectable to a charging station 200 through a charging cable 230 and provided with a battery 10, which is chargeable from the charging station 200 through the charging cable 230. The battery 10 mounted in the vehicle 100 has preferably a large capacity of charge.

The charging station 200 for charging the battery 10 of the vehicle 100 is provided at a charging facility 20. The charging station 200 is used as one example of charging equipment.

As shown in FIG. 1, FIG. 4, FIG. 7 and FIG. 8, the charging station 200 includes a charger-side terminal circuit 210, a control circuit 220, the charging cable 230, a charger-side first relay 251, a charger-side second relay 252, a charger-side photo coupler 253 and the like. The charging station 200 is preferably a quick-charging type. The quick-charging type is subjected to CHAdeMO (trademark) standard, for example.

In the following description, the charger-side terminal circuit 210, the charger-side first relay 251, the charger-side second relay 252 and the charger-side photo coupler 253 are abbreviated as an external terminal circuit 210, a first relay 251, a second relay 252 and an external photo coupler 253, respectively. The external terminal circuit 210 corresponds to a facility-side terminal circuit.

Figure 8:
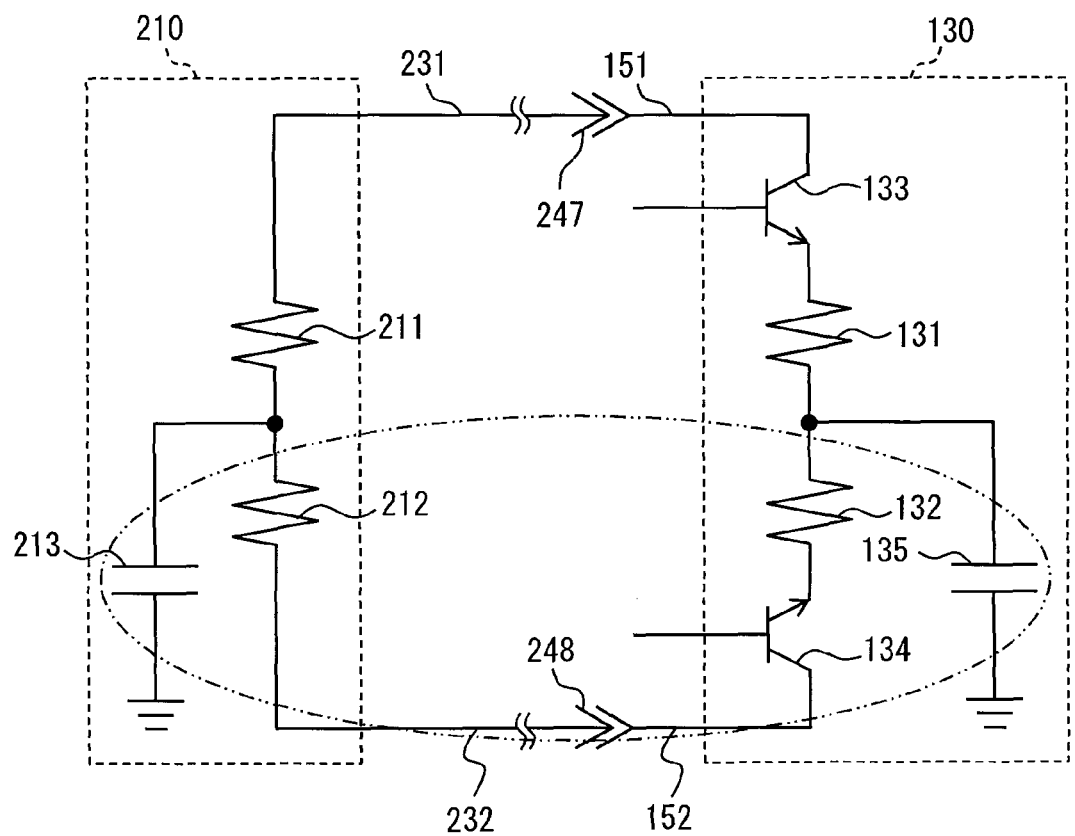
FIG. 8 is a circuit diagram showing generally the charging station and the first terminal circuit in a state that the charging station is connected in the embodiment.

The external terminal circuit 210 is provided inside the charging station 200. As shown in FIG. 8, the external charging circuit 210 includes two terminal resistors 211, 212, which are connected in series, and a capacitor 213, which is provided as a noise-filtering element and connected to a middle point (junction) between the two terminal resistors 211, 212. A combined resistance of the two terminal resistors 211 and 212 is, for example, 120 Ω. The external terminal circuit 210 is connected to a high-potential-side line 231 and a low-potential-side line 232, which form a double-wire communication line. The high-potential-side line 231 and the low-potential-side line 232 are provided to extend from an inside of the charging station 200 to a charging plug 240 through an inside of the charging cable 230. The charging plug 240 is at a top end of the charging cable 230. "High potential" and "low potential" of the high-potential-side line 231 and the low-potential-side line 232 indicate relative potentials between the lines.

Figure 7:
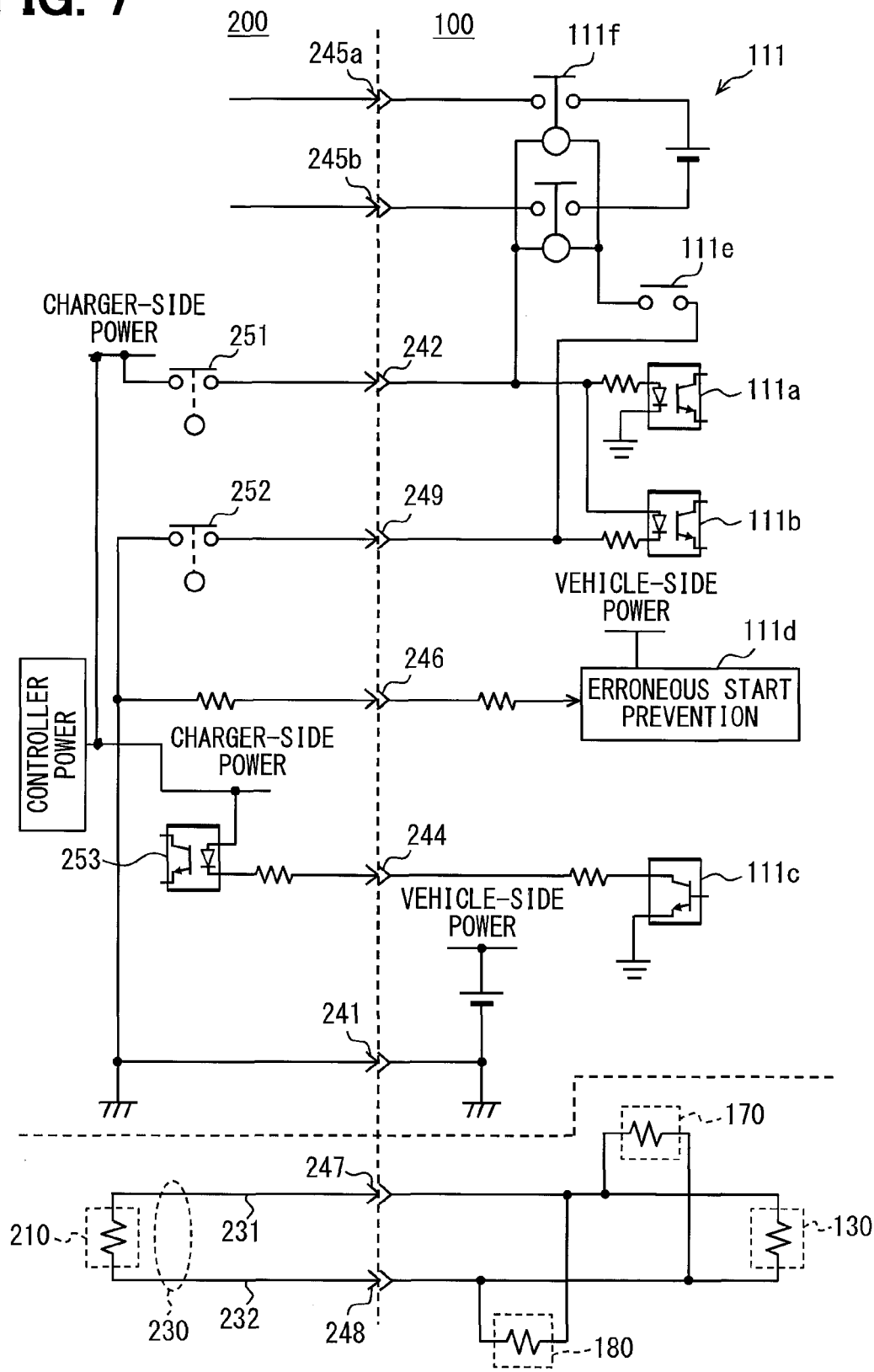
FIG. 7 is a circuit diagram showing generally a charging station and a charging circuit in the embodiment.

The control circuit 220 is provided to control communication with the vehicle 100 through the high-potential-side line 231 and the low-potential-side line 232, charging of the battery 10 through the power cable as described later, operations of the first relay 251, the second relay 252 and the external photo coupler 253. The control circuit 220 is formed primarily of a programmed computer such as a microcomputer. As shown in FIG. 7, for example, the charging station 200 has a circuit configuration, which includes the first relay 251, the second relay 252, the external photo coupler 253 and the like, for charging the battery 10. The first relay 251 is switchable to an on-state and an off-state. The first relay 251 outputs or passes a first charging-start stop signal in the on-state and stops or shut off the first charging-start stop signal in the off-state, respectively. The second relay 252 is also switchable to an on-state and an off-state. The second relay 252 outputs or passes a second charging-start stop signal in the on-state and stops or shuts off the second charging-start stop signal in the off-state, respectively. The external photo coupler 253 is also switchable to an on-state and an off-state. The external photo coupler 253 turns on and off when a charging-permission prohibition signal is outputted and stopped, respectively.

The charging cable 230 includes the high-potential-side line 231 and the low-potential-side line 232 as the communication line in addition to the power cable for charging. The charging cable 230 is connected to a main body of the charging station 200 at one end thereof and to the charging plug 240 at the other end thereof. The power cable is provided to extend from the inside of the main body of the charging station 200 to the charging plug 240 at the top end through the charging cable 230. The high-potential-side line 231 and the low-potential-side line 232 correspond to a facility-side communication line. The high-potential-side line 231 and the low-potential-side line 232 are therefore occasionally referred to the facility-side communication line collectively below.

Figure 4:
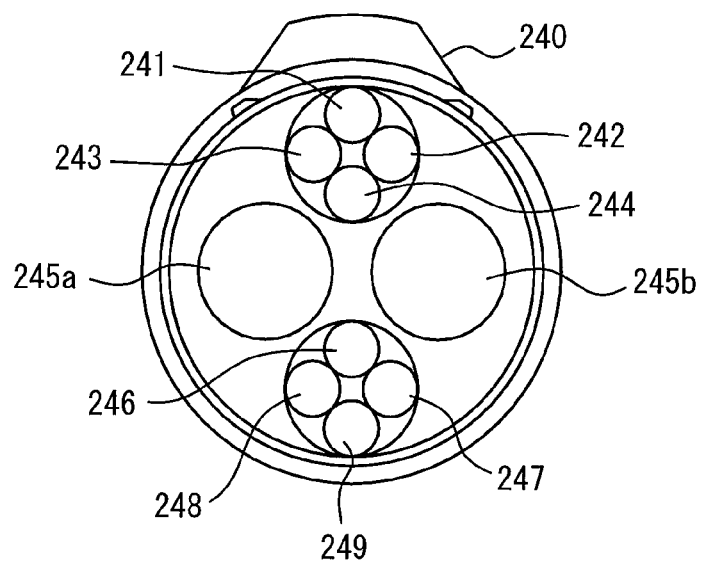
FIG. 4 is a schematic diagram showing generally a charging plug in the embodiment.

The charging plug 240 is configured to be engageable and disengageable relative to a charging port 100b of the vehicle 100. That is, the charging cable 230 is detachably engageable with the charging port 100b through the charging plug 240. As shown in FIG. 4, the charging plug 240 is provided with plural terminals 241 to 244, 245a, 245b, and 246 to 249. These terminals are connected electrically to a charging circuit 111 of the vehicle 100 as shown in FIG. 7, when the charging plug 240 is engaged to the charging port 100b of the vehicle 100.

These terminals include a ground terminal 241, a first start stop terminal 242, an idle terminal 243, a permission prohibition terminal 245, a connector-connection confirming terminal 246, a second start stop terminal 249, a high-potential-side power terminal 245a, a low-potential-side power terminal 245b. The high-potential-side power terminal 245a and the low-potential-side power terminal 245b are provided at the top end of the power cable. These terminals further include a high-potential-side terminal 247, a low-potential-side terminal 248. The high-potential-side power terminal 247 is provided at the top end of the high-potential-side line 231. The low-potential-side power terminal 248 is provided at the top end of the low-potential-side line 232.

Since the charging station 200 is provided with the high-potential-side line 231 and the low-potential-side line 232 in addition to the power cable for charging, the charging station 200 can perform not only charging the battery 10 of the vehicle 100 but also communication with the electronic device such as a first ECU 110 mounted in the vehicle 100. The charging station 200 is configured to be able to perform communication by way of the differential voltage method through the high-potential-side line 231 and the low-potential-side line 232. That is, the charging station 200 communicates with the electronic device such as the first ECU 110 by way of the communication system, which uses a differential voltage developed between the high-potential-side line 231 and the low-potential-side line 232. One example of this communication is a controller area network (CAN: registered trademark) communication.

Figure 2:
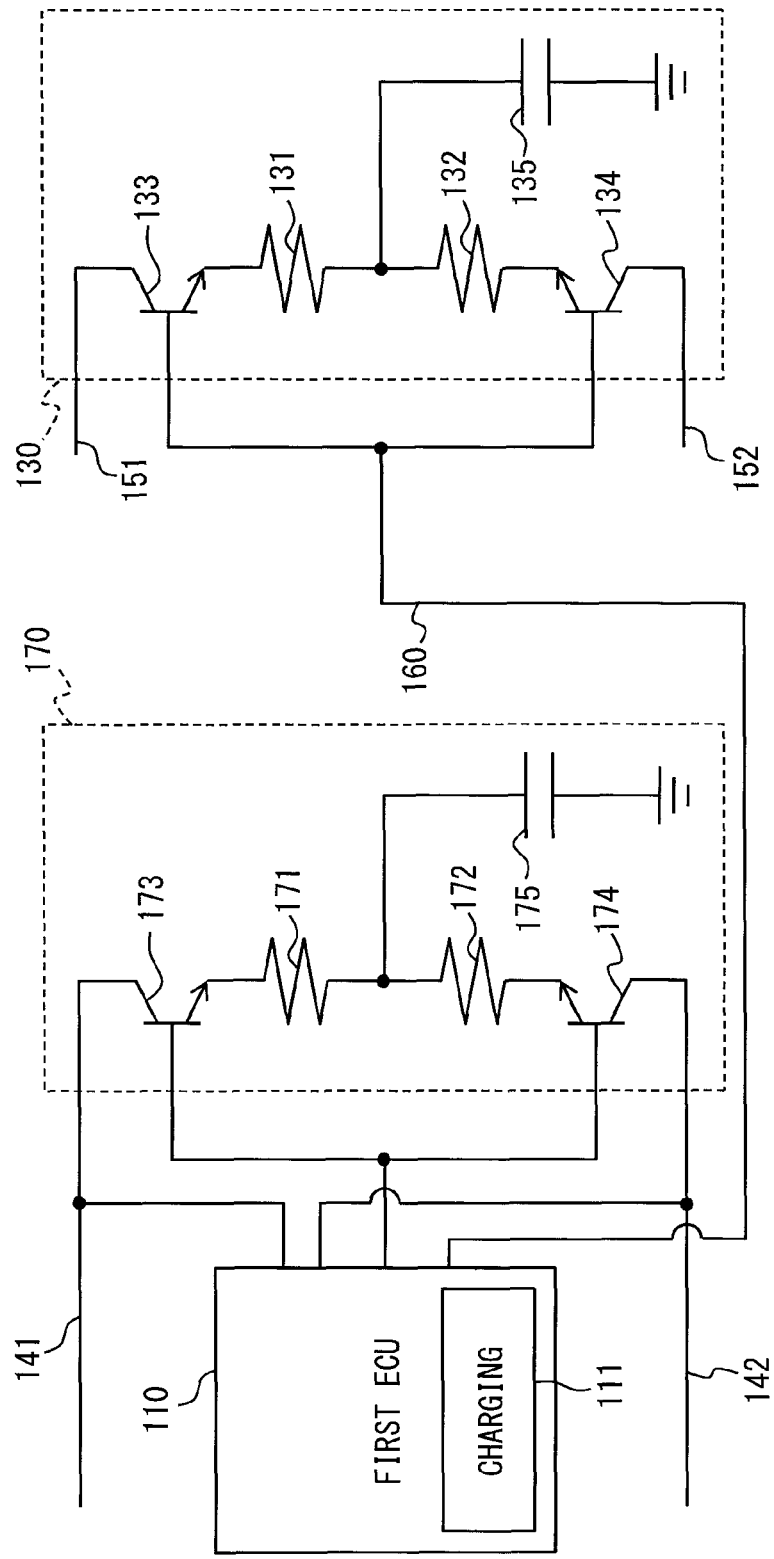
FIG. 2 is a circuit diagram showing generally a first terminal circuit and a second terminal circuit in the embodiment.
Figure 3:
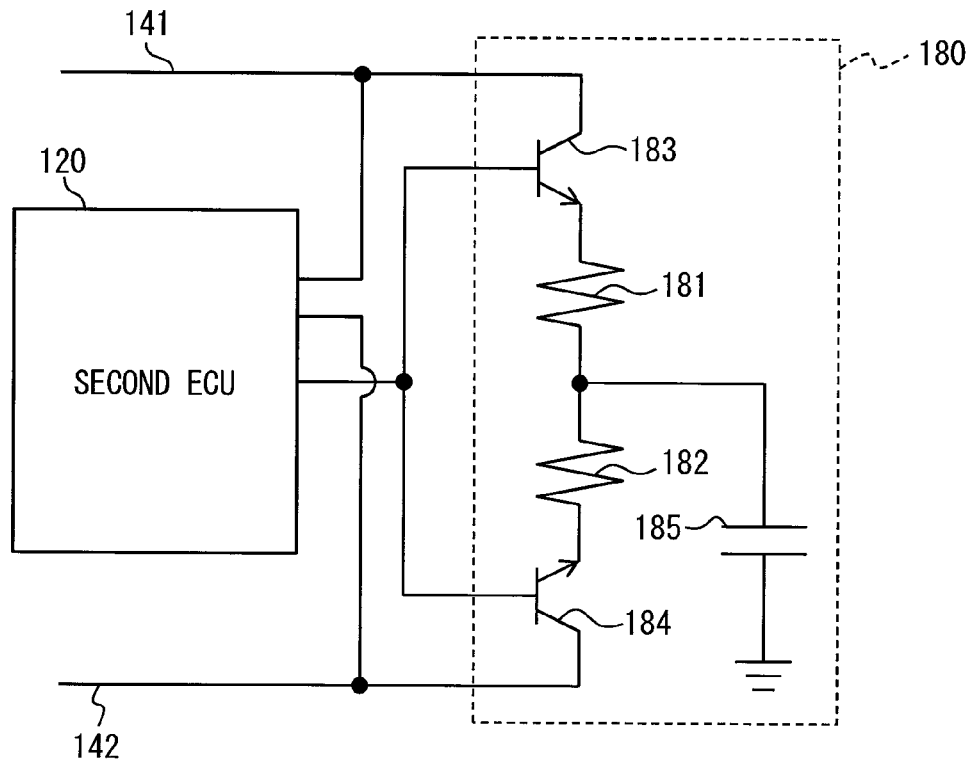
FIG. 3 is a circuit diagram showing generally a third terminal circuit in the embodiment.

As shown in FIG. 1 to FIG. 3, the in-vehicle control system includes, in addition to the first ECU 110, a second ECU 120, a first communication line 140, a second communication line 150, a first terminal circuit 130, a second terminal circuit 170 and a third terminal circuit 180. Thus, the in-vehicle control system includes an in-vehicle network, which is formed of the first communication line 140, the second communication line 150, the first ECU 110 and the second ECU 120. The first ECU 110 and the second ECU 120 are nodes, which are connected to these communication lines. The ECU is an abbreviation of an electronic control unit.

The first ECU 110 and the second ECU 120 correspond to electronic devices. The first communication line 140 and the second communication line 150 correspond to a vehicle-side communication line. Each of the first terminal circuit 130, the second terminal circuit 170 and the third terminal circuit 180 correspond to vehicle-side terminal circuits. The first terminal circuit 130 corresponds to a charging port terminal circuit.

Each of the first ECU 110 and the second ECU 120 is the electronic control unit, which includes a processor, a memory, an input/output circuit, a communication circuit and the like and performs arithmetic operations required for controlling a vehicle. Each of the first ECU 110 and the second ECU 120 is booted and initialized in a sleep state or a wait state, for example, when the charging plug 240 is engaged to the charging port 100b.

The first ECU 110 and the second ECU 120 are connected to the first communication line 140 and configured to be able to communicate each other by way of the differential voltage method through respective communication circuits and the first communication line 140. The first ECU 110 is provided with a charging circuit 111, which controls charging of the battery 10. The first ECU 110 is configured to be able to communicate with the control circuit 220 through the first communication line 140, the second communication line 150 and the facility-side communication line. The first ECU 110 thus corresponds to a charging control device. That is, plural ECUs 110 and 120 are configured to be able to communicate with the control circuit 220 through the second communication line 150 and the facility-side communication line and includes at least one control device.

The first ECU 110 has a function of controlling validation and invalidation of the first terminal circuit 130 and the second terminal circuit 170. The second ECU 120 has a function of controlling validation and invalidation of the third terminal circuit 180. The invalidation means rendering the terminal circuit to be inoperative, that is, disabling or prohibiting the operation of the terminal circuit. The validation means rendering the terminal circuit to be operative, that is, enabling or permitting the operation of the terminal circuit.

The electronic device, exemplified as ECU, includes a communication circuit and may be incorporated in a sensor, which is configured to be able to perform communication by way of the differential voltage method through the first communication line 140 and the second communication line 150. In addition to the first ECU 110 and the second ECU 120, other electronic devices may be connected to the first communication line 140 and the second communication line 150.

The first communication line 140 and the second communication line 150 are connected to each other and are double-wire type communication line, which are provided with three terminal circuits, that is, the first terminal circuit 130, the second terminal circuit 170 and the third terminal circuit 180. Specifically, the first communication line 140 includes a line 141 and a line 142 as well as the second terminal circuit 170 and the third terminal circuit 180. The second communication line 150 includes the second high-potential-side line 151 and the second low-potential-side line 152 as well as the first terminal circuit 130. In the first communication line 140 and the second communication line 150, the line 141 and the second high-potential-side line 151 are connected to each other and the line 142 and the second low-potential-side line 152 are connected to each other. In the in-vehicle network, it is preferred that two terminal circuits are provided for ensuring quality of communication of the first ECU 110 and the second ECU 120.

The first communication line 140 and the second communication line 150 are configured to be connectable with the facility-side communication line. More specifically, in the second communication line 150, when the charging plug 240 is attached to the charging port 100b, the second high-potential-side line 151 and the high-potential-side line 231 are connected and the second low-potential-side line 152 and the low-potential-side line 232 are connected. Thus, the first ECU 110 is connected to the control circuit 220 of the charging station 200.

As shown in FIG. 2, the first terminal circuit 130 includes a first terminal resistor 131 and a second terminal resistor 132, which are two series-connected resistors, and a first capacitor 135, which is connected to a middle point of the two terminal resistors 131 and 132 as a noise-filtering element. A combined resistance of the two terminal resistors 131 and 132 is 120 Ω, for example. The first terminal circuit 130 is connected to the second high-potential-side line 151 and the second low-potential-side line 152.

Further, the first terminal circuit 130 is configured to include a first changeover switch 133 and a second changeover switch 134 for validating and invalidating the first terminal circuit 130. The first changeover switch 133 and the second changeover switch 134 may occasionally be referred to as a changeover switch 13 collectively. This changeover switch 13 corresponds to a changeover member. The changeover switch 13 is connected to the first ECU 110 through a command line 160 and configured to be turned on and off by the first ECU 110. When the changeover switch 13 is turned on by the first ECU 110, the changeover switch 13 connects the first terminal resistor 131 and the second terminal resistor 132 to the second high-potential-side line 151 and the second low-potential-side line 152, so that the first terminal circuit 130 is validated, that is, rendered operative. When the changeover switch 13 is turned off by the first ECU 110, the changeover switch 13 disconnects the first terminal resistor 131 and the second terminal resistor 132 from the second high-potential-side line 151 and the second low-potential-side line 152, so that the first terminal circuit 130 is invalidated, that is, rendered inoperative. The changeover switch 13, when turned off, disconnects also the first capacitor 135 from the second high-potential-side line 151 and the second low-potential-side line 152.

In addition, as shown in FIG. 1, the first terminal circuit 130 is located at a position closer to the charging port 100b than to connection point of the first communication line 140 and the second communication line 150. It is preferred moreover that the first terminal circuit 130 is provided as close as possible to the charging port 100b.

Figure 9:
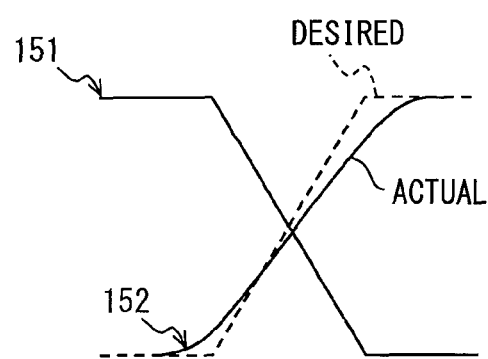
FIG. 9 is a waveform chart showing waveforms at a high-potential-side line and a low-potential-side line in the embodiment.

The changeover member is not limited to the above-described switches. The changeover member may be configured to have only the first changeover switch 133 without the second changeover switch 134, for example. In this case, when the first changeover switch 133 is turned off, a current having a frequency flows from the second low-potential-side line 152 to the ground through the second terminal resistor 132. As a result, an actual communication waveform of the second high-potential-side line 151 and the second low-potential-side line 152 tends to be smoothed and rounded as indicated by a solid line in FIG. 9.

However, since the changeover switch 13 is provided in the present embodiment, each of the second high-potential-side line 151 and the second low-potential-side line 152 can be validated and invalidated. That is, since the changeover switch 13 connects and disconnects both of the first terminal resistor 131 and the second terminal resistor 132 to the second high-potential-side line 151 and the second low-potential-side line 152, the validation and the invalidation can be performed surely. Thus the in-vehicle control system can maintain symmetry of communication waveform as indicated by a dotted line in FIG. 9 as a desired waveform.

The second terminal circuit 170 and the third terminal circuit 180 have the same configuration as the first circuit 130 and hence no detailed description will be made. It is noted however that circuit components in the second terminal circuit 170 and the third terminal circuit 180 are identified with different names and symbols.

As shown in FIG. 2, the second terminal circuit 170 includes a third terminal resistor 171 and a fourth terminal resistor 172, which are two series-connected resistors, and a second capacitor 175, which is connected to a middle point of the two terminal resistors 171 and 172 as a noise-filtering element. Further, the second terminal circuit 170 is configured to include a third changeover switch 173 and a fourth changeover switch 174 for validating and invalidating the second terminal circuit 170. The second terminal circuit 170 is connected to the line 141 and the line 142. The third changeover switch 173 and the fourth changeover switch 174 may occasionally be referred to as a changeover switch 17 collectively.

As shown in FIG. 3, the third terminal circuit 180 includes a fifth terminal resistor 181 and a sixth terminal resistor 182, which are two series-connected resistors, and a third capacitor 185, which is connected to a middle point of the two terminal resistors 181 and 182 as a noise-filtering element. Further, the third terminal circuit 180 is configured to include a fifth changeover switch 183 and a sixth changeover switch 184 for validating and invalidating the third terminal circuit 180. The third terminal circuit 180 is connected to the line 141 and the line 142. The switch 183 and the switch 184 may occasionally be referred to as a changeover switch 18 collectively.

In the present embodiment, the changeover member is provided in each of the terminal circuits 130, 170 and 180. However, the changeover member for validating and invalidating the first terminal circuit 130 may be provided at a position other than the first terminal circuit 130.

As shown in FIG. 7, the charging circuit 111 is configured to include a first photo coupler 111a, a second photo coupler 111b, a switch 111c, an erroneous start preventing circuit 111d, a vehicle-side relay 111c, a contactor 111f and the like. The first photo coupler 111a is switchable to an on-state and an off-state. It turns on and off when the first charging-start stop signal is outputted and stopped, respectively. The second photo coupler 111b is switchable to an on-state and an off-state. It turns on and off when the second charging-start stop signal is outputted and stopped, respectively. The switch 111c is switchable to an on-state and an off-state. It outputs the charging-permission prohibition signal and stops outputting the same when turned on and off, respectively. This charging circuit 111 is conventional and hence no detailed description will be made.

The processing operations of the first ECU 110 and the second ECU 120 will be described with reference to FIG. 5 and FIG. 6. The first ECU 110 executes the processing shown as a flowchart in FIG. 5 at every predetermined time. Similarly, the second ECU 120 executes the processing shown as a flowchart in FIG. 6 at every predetermined time.

At step S10, the first ECU 110 checks whether the charging plug 240 is engaged with the charging port 100b of the vehicle 100. Similarly, at step S100, the second ECU 120 checks whether the charging plug 240 is in engagement with the charging port 100b of the vehicle 100. Upon determination that the charging plug 240 is not in engagement, the first ECU 110 determines that the facility-side communication line is not connected to the second communication line 150 and executes step S40. Upon determination that the charging plug 240 is not in engagement, the second ECU 120 determines that the facility-side communication line is not connected to the second communication line 150 and executes step S120. When the facility-side communication line is not connected to the second communication line 150, the external terminal circuit 210 is not connected to the in-vehicle network. It is thus understood that, upon determination that the charging plug 240 is not engaged, the first ECU 110 and the second ECU 120 determine that the three terminal circuits are connected to the in-vehicle network and execute step S40 and step S120. The three circuits are the first terminal circuit 130, the second terminal circuit 170 and the third terminal circuit 180.

Upon determination that the charging plug 240 is in engagement with the charging port 240, the first ECU 110 determines that the facility-side communication line is connected to the second communication line 150 and executes step S20. Upon determination that the charging plug 240 is engaged, the second ECU 120 determines that the facility-side communication line is connected to the second communication line 150 and executes step S110. When the facility-side communication line is connected to the second communication line 150, the external terminal circuit 210 is not connected to the in-vehicle network. It is thus understood that, upon determination that the charging plug 240 is engaged, the first ECU 110 and the second ECU 120 determine that the four terminal circuits are connected to the in-vehicle network and execute step S20 and step S110. The four terminal circuits are the first terminal circuit 130, the second terminal circuit 170, the third terminal circuit 180 and the external terminal circuit 210.

As described above, the in-vehicle network preferably has two terminal circuits to ensure quality of communication. However, when the facility-side communication line is not connected to the second communication line 150, the in-vehicle network has three terminal circuits. In this case, the combined resistance of the terminal circuits of the in-vehicle network is 40 Ω. Further, as shown in FIG. 7, the communication line, in which the facility-side communication line is connected to the second communication line 150, has four terminal circuits. In this case, the combined resistance of the terminal circuits is 30 Ω. In a case that the communication is performed through the communication line having the three or four terminal circuits as described above, it tends to fail to satisfy communication standards. Further, in a case that the combined resistance of the terminal circuits is 30 Ω or 40 Ω, a voltage amplitude of the communication line, which has three or four terminal circuits, tends to decrease and lowers the quality of communication.

For this reason, in a case that the facility-side communication line is not connected to the communication line 150, the first ECU 110 invalidates the first terminal circuit 130 at step S40 and validates the second terminal circuit 170 at step S50. Specifically, the switch 13 invalidates the first terminal circuit 130 by turning off in response to a command from the first ECU 110. The switch 17 validates the second terminal circuit 170 by turning on in response to a command from the first ECU 110. The second ECU 120 validates the third terminal circuit 180 at step S120. Specifically, the switch 18 validates the third terminal circuit 180 by turning on in response to a command from the second ECU 120. That is, when the facility-side communication line is not connected to the second communication line 150, the in-vehicle control system invalidates the first terminal circuit 130 and validates the second terminal circuit 170 and the third terminal circuit 180 as shown before time t1 and after time t14 in FIG. 11.

When the facility-side communication line is connected to the second communication line 150, the first ECU 110 validates the first terminal circuit 130 at step S20 and invalidates the second terminal circuit 170 at step S30. Specifically, the switch 13 validates the first terminal circuit 130 by turning on in response to a command from the first ECU 110. The switch 17 invalidates the second terminal circuit 170 by turning off in response to a command from the first ECU 110. The second ECU 120 invalidates the third terminal circuit 180 at step S110. Specifically, the switch 18 invalidates the third terminal circuit 180 by turning off in response to a command from the second ECU 120. That is, when the facility-side communication line is connected to the second communication line 150, the in-vehicle control system validates the first terminal circuit 130 and invalidates the second terminal circuit 170 and the third terminal circuit 180 as shown between time t4 and time t14 in FIG. 11.

As described above, the in-vehicle system includes the changeover switches 13, 17 and 18, which validate and invalidate the first terminal circuit 130, the second terminal circuit 170 and the third terminal circuit 180 individually. When the facility-side communication line is not connected to the second communication line 150, the in-vehicle control system validates two circuits of the first to third terminal circuits 130, 170 and 180 and invalidates the remaining one circuit of the first to third terminal circuits 130, 170 and 180 by the changeover switches 13, 17 and 18. Thus, when the facility-side communication line is not connected to the second communication line 150, the in-vehicle control system can limit the number of the terminal circuits of the in-vehicle network to two circuits. Accordingly, when the facility-side communication line is not connected to the second communication line 150, the in-vehicle control system can assure quality of communication performed through the first communication line 140 between the first ECU 110 and the second ECU 120.

When the facility-side communication line is connected to the second communication line 150, the in-vehicle control system validates one circuit of the first to third terminal circuits 130, 170 and 180 and invalidates the remaining two circuits of the first to third terminal circuits 130, 170 and 180 by the changeover switches 13, 17 and 18. Thus, when the facility-side communication line is connected to the second communication line 150, the in-vehicle control system can limit the number of the terminal circuits of the communication line, to which the second communication line 150 and the facility-side communication line are connected, to two circuits, one of which is one of the first to third terminal circuits 130, 170 and 180, and the other of which is the external terminal circuit 210. Accordingly, when the facility-side communication line is connected to the second communication line 150, the in-vehicle control system can assure quality of communication performed through the facility-side communication line between the control circuit 220 and the first ECU 110. Thus the in-vehicle control system is enabled to communicate with the charging station 200 while ensuring quality of communication.

As one method for appropriately setting a terminal resistor for ensuring quality of communication described above, a gateway may be provided. However, the gateway adds cost. On the contrary, the embodiment described above can maintain the quality of communication as described above without providing the gateway.

Particularly in the present embodiment, when the facility-side communication line is not connected to the second communication line 150, each changeover member invalidates the first terminal circuit 130 and validates the remaining two terminal circuits, which are the second terminal circuit 170 and the third terminal circuit 180. On the other hand, when the facility-side communication line is connected to the second communication line 150, each changeover member validates only the first terminal circuit 130 and invalidates the remaining two terminal circuits, which are the second terminal circuit 170 and the third terminal circuit 180. With this control, the in-vehicle control system can minimize a loop of common mode noise among the charging station 200, the vehicle 100 and the ground as shown by a two-dot chain line in FIG. 8, when the facility-side communication line is connected to the second communication line 150.

Thus the in-vehicle control system can lead external noises, particularly electromagnetic noise generated from the charging station 200, to the ground thereby suppressing the noise from being superposed on the second communication line 150 and degradation of the quality of communication.

However, the in-vehicle control system is not limited to the embodiment described above but may be configured as follows. When the facility-side communication line is not connected to the second communication line 150, the changeover members may validate two circuits of the first to third terminal circuits 130, 170 and 180 and invalidate the remaining one circuit. When the facility-side communication line is connected to the second communication line 150, the changeover members may validate only one circuit of the first to third terminal circuits 130, 170 and 180 and invalidate the remaining two circuits.

The first ECU 110 and the second ECU 120 may command validation and invalidation of each of the first to third terminal circuits 130, 170 and 180 to each of the changeover switches 13, 17 and 18 individually based on whether the facility-side communication line is connected to the second communication line 150. That is, in the in-vehicle control system, the first ECU 110 and the second ECU 120 may command validation and invalidation. With this configuration, the in-vehicle control system can validate and invalidate each of the first to third terminal circuits 130, 170 and 180 by an electronic device, that is, a conventional electronic device, included in the in-vehicle network. That is, no new ECU need be provided to validate and invalidate each of the first to third terminal circuits 130, 170 and 180. For this reason, this in-vehicle control system does not add cost.

Further, when the facility-side communication line is connected to the second communication line 150, the first ECU 110 and the second ECU 120 preferably limit the number of terminal circuits to two before the control circuit 220 and the first ECU 110 start communication. That is, the first ECU 110 and the second ECU 120 preferably command validation of one circuit of the first to third terminal circuits 130, 170 and 180 and invalidation of remaining two circuits before the communication starts between the control circuit 220 and the first ECU 110. With this configuration, the in-vehicle control system can start the communication between the control unit 220 and the first ECU 110 with ensured quality of communication.

The in-vehicle control system described with reference to the embodiment may be implemented differently as modified embodiments described below. First to sixth modified embodiments. The above-described embodiment and the first to sixth modified embodiments may be implemented individually or in combination.

First Modified Embodiment

Figure 10:
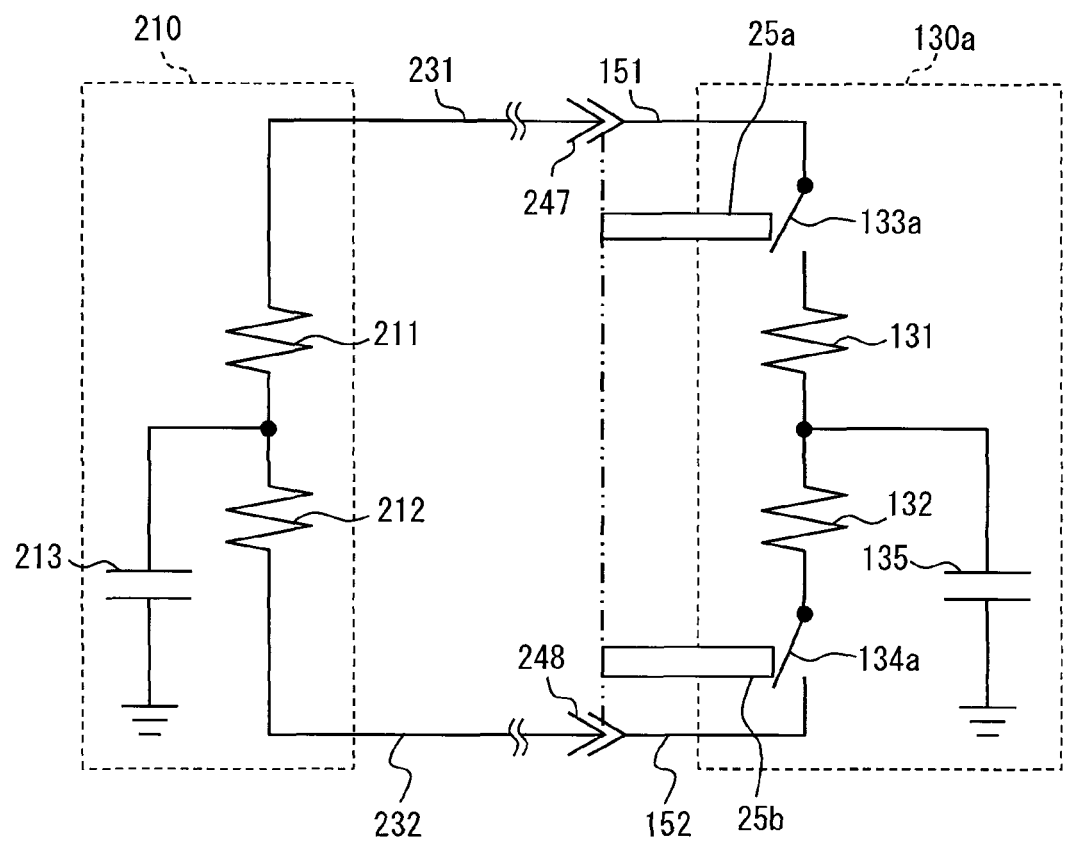
FIG. 10 is a circuit diagram showing generally the charging station and the first terminal circuit in a state that the charging station is connected in a first modified embodiment.

A vehicle control system according to a first modified embodiment will be described with reference to FIG. 10 and FIG. 11. The first modified embodiment is different from the embodiment described above in the structure of the changeover member. Only different points are described here. Other points are the same between the first modified embodiment and the above-described embodiment. In the first modified embodiment, the changeover member is provided in a first terminal circuit 130a. Thus the first modified embodiment is different in that the first terminal circuit 130a is configured differently from the first terminal circuit 130.

The first terminal circuit 130a is provided with a first changeover switch 133a and a second changeover switch 134a, which are mechanical switches. The first changeover switch 133a and the second changeover switch 134a correspond to changeover members. That is, the first terminal circuit 130a is provided with changeover members, which validate and invalidate the first terminal circuit 130a mechanically. The first changeover switch 133a and the second changeover switch 134a are configured to be in the off-states, when not pressed by the charging plug 240, to disconnect both of the first terminal resistor 131 and the second terminal resistor 132 from the second high-potential-side line 151 and the second low-potential-side line 152, respectively. The first changeover switch 133a and the second changeover switch 134a are configured to be in the on-states, when pressed by the charging plug 240, to connect both of the first terminal resistor 131 and the second terminal resistor 132 from the second high-potential-side line 151 and the second low-potential-side line 152, respectively.

The charging plug 240 has a first pressing member 25a and a second pressing member 25b, which turn on the first changeover switch 133a and the second changeover switch 134a, respectively, when the charging plug 240 is engaged with the charging port 100b. The first changeover switch 133a and the second changeover switch 134a are located to be able to be pressed by the first pressing member 25a and the second pressing member 25b, respectively, when the charging plug 240 is connected to the charging part 100b. That is, the first changeover switch 133a and the second changeover switch 134a are configured to be able to be pressed by the charging plug 240, which is a part of the charging cable 230.

The processing operations at the charging station 200 side and the vehicle 100 side will be described with reference to FIG. 11. It is assumed that the charging plug 240 is engaged to the charging port 100b at time t1. The user issues a charging command after engaging the charging plug 240 to the charging port 100b.

When the charging plug 240 is connected to the charging port 100b, the first changeover switch 133a and the second changeover switch 134a are pressed by the first pressing member 25a and the second pressing member 25b, respectively, to turn on for validating the first terminal circuit 130a. That is, when the charging plug 240 is connected to the charging port 100b, the first changeover switch 133a and the second changeover switch 134a are switched over from the invalidated state to the validated state.

The first changeover switch 133a and the second changeover switch 134a are able to validate the first terminal circuit 130a at time t1. In this state, the second terminal circuit 170, the third terminal circuit 180 and the charger-side terminal circuit 210 are connected to the communication line. The communication state between the first ECU 110 and the control circuit 220 and the communication state between the first ECU 110 and the second ECU 120 are in the prohibition state (OFF), in which the communication is prohibited. At time t2, the first relay 251 turns on. At time t3, the first photo coupler 111a turns on correspondingly. The first relay 251 turns on in response to the charging command by the user or the like. The first ECU 110 and the second ECU 120 are booted up when the first relay 251 turns on.

With the first photo coupler 111a turned on, the first ECU 110 and the second ECU 120 invalidate the second terminal circuit 170 and the third terminal circuit 180 at time t4. That is, the first ECU 110 and the second ECU 120 switch over the second terminal circuit 170 and the third terminal circuit 180 from the valid state to the invalid state. Thus, the in-vehicle control system separates the terminal circuits in the communication line, to which the second communication line 150 and the facility-side communication line are connected, into two circuits, that is, the first terminal circuit 130 and the charger-side terminal circuit 210. The communication state between the first ECU 110 and the control circuit 220 and the communication state between the first ECU 110 and the second ECU 120 are set to be in the permission state (ON), in which the communication is permitted, at time t5. When the first ECU 110 is set to be in the permission state at time t5, the first ECU 110 transmits the information about the battery 10 of the vehicle 100 to the control circuit 220. When the control circuit 220 is set to be in the permission state at time t5, the control circuit 220 transmits the information about the charging station 200 (that is, information about a charger) to the first ECU 110.

When the first ECU 110 is booted up, the first ECU 110 checks whether the battery 10 may be charged based on the temperature of the battery 10 or the like of the vehicle 100. The first ECU 110 turns on the switch 111c upon determination that the battery 10 may be charged. The first ECU 110 may turn on the switch 111c, when the first photo coupler 111a is in the on-state and the battery 10 may be charged. This switch 111c is for indicating the charging permission or the charging prohibition. The on-state indicates the charging permission and the off-state indicates the charging prohibition. The first ECU 110 turns on the switch 111c at time t6. The external photo coupler 253 turns on correspondingly. Further, the second relay 252 turns on at time t7.

At time t8, the second photo coupler 111b turns on in response to the turn-on of the relay 252. At time t9, the erroneous start prevention circuit 111d starts to operate. The erroneous start prevention circuit 111d surely stops the vehicle 100 by the parking lock so that a part of the charging cable 230, which is at a high-voltage, is prevented from being broken and exposed. Since the erroneous start prevention circuit 111d is provided for the reason described above, the erroneous start prevention circuit 111d continues to be in the activated state until the charging plug 240 is disengaged from the charging port 100b.

When the erroneous start prevention circuit 111d starts to operate with the turn-on of the switch 111c, the charging from the charging station 200 to the battery 10 of the vehicle 100 is permitted to start. In a period from time t9 to time t10, the control circuit 220 and the first ECU 110 transmit and receive the command value of the charging current and the state of the charger.

At time t10 and thereafter, charging finishing processing is executed. At time t10, the first ECU 110 turns off the switch 111c. At time t11, the first relay 251 turns off correspondingly. Further, the second relay 252 turns off immediately after t11. At time t12, the first photo coupler 111a and the second photo coupler 111b turn of At time t13, the charging finishing processing is completed.

When the charging is finished, the user disengages the charging plug 240 from the part 100b at time t14. When the charging plug 240 is not connected to the port 100b, the first changeover switch 133a and the second changeover switch 134a turn off because of no pressing force from the charging plug 240 and invalidate the first terminal circuit 130a. Therefore, the first changeover switch 133a and the second changeover switch 134a can invalidate the first terminal circuit 130a at time t14 in FIG. 11. At time t14, the first ECU 110 and the second ECU 120 validate the second terminal circuit 170 and the third terminal circuit 180. With this validation, the in-vehicle control system can separate the terminal circuit in the communication line, to which the first communication line 140 and the second communication line 150 are connected, into the second terminal circuit 170 and the third terminal circuit 180.

The first modified embodiment provides the similar advantage as the embodiment described above. In addition, the first modified embodiment does not require the command line 160, which extends from the first ECU 110 to the first terminal circuit 130a. The first modified embodiment thus reduces cost because of no provision of the command line 160.

Figure 11:
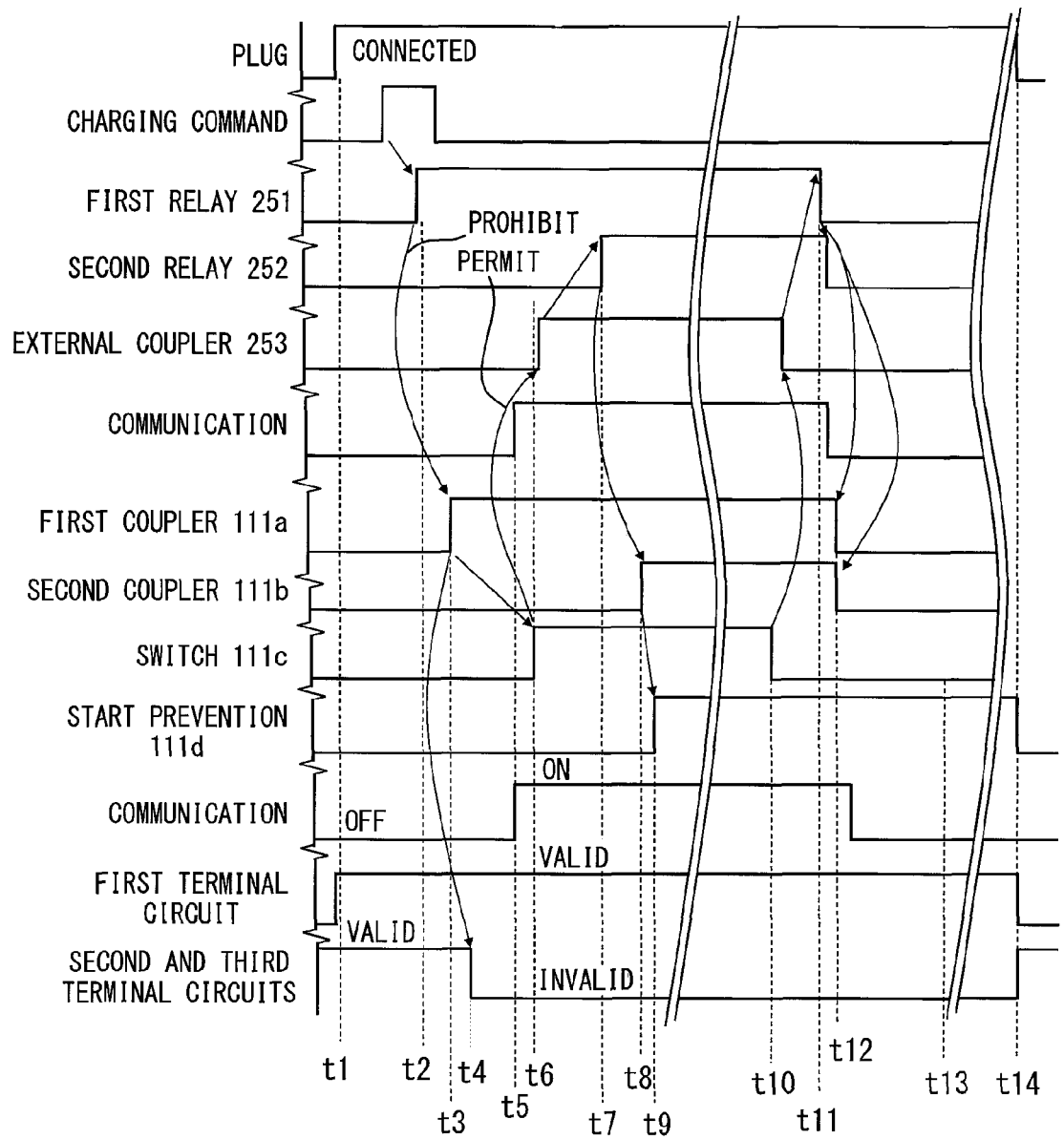
FIG. 11 is a time chart showing generally processing operations of the charging station and an in-vehicle control system in the first modified embodiment.

It is noted that the terminal circuits are three or more during the period from time t1 to time t4 in FIG. 11. However, the communication between the control circuit 220 and the first ECU 110 starts from time t5. Since the period from t1 to time t4 is before the communication is started, the quality of communication is not lowered even when three or more terminal circuits are provided.

The period from the time point t2 in FIG. 11 as a reference time, at which the first relay 251 turns on, the period of the operation start of the second ECU 120 and the invalidation processing of the second terminal circuit 170 and the third terminal circuit is about 100 ms at a maximum. That is, the period from time t2 to time t4 is about 100 ms at a maximum. For this reason, the transmission and reception operation between the control circuit 220 and the first ECU 110 is 4 seconds at a maximum. As a result, the quality of communication between the control circuit 220 and the first ECU 110 is hardly lowered. After 100 ms from the turn-on of the relay 251, that is, after time t4, the quality of communication between the control circuit 220 and the first ECU 110 and the communication between the first ECU 110 and the second ECU 120 can be maintained.

The in-vehicle control system according to the embodiment described above is different from the first modified embodiment only in the time point of validation of the first terminal circuit 130, and is the same as shown in the time chart of FIG. 11 with respect to other time points. In the in-vehicle control system according to the embodiment described above, the first terminal circuit 130 is validated at time t4.

Second Modified Embodiment

Figure 12:
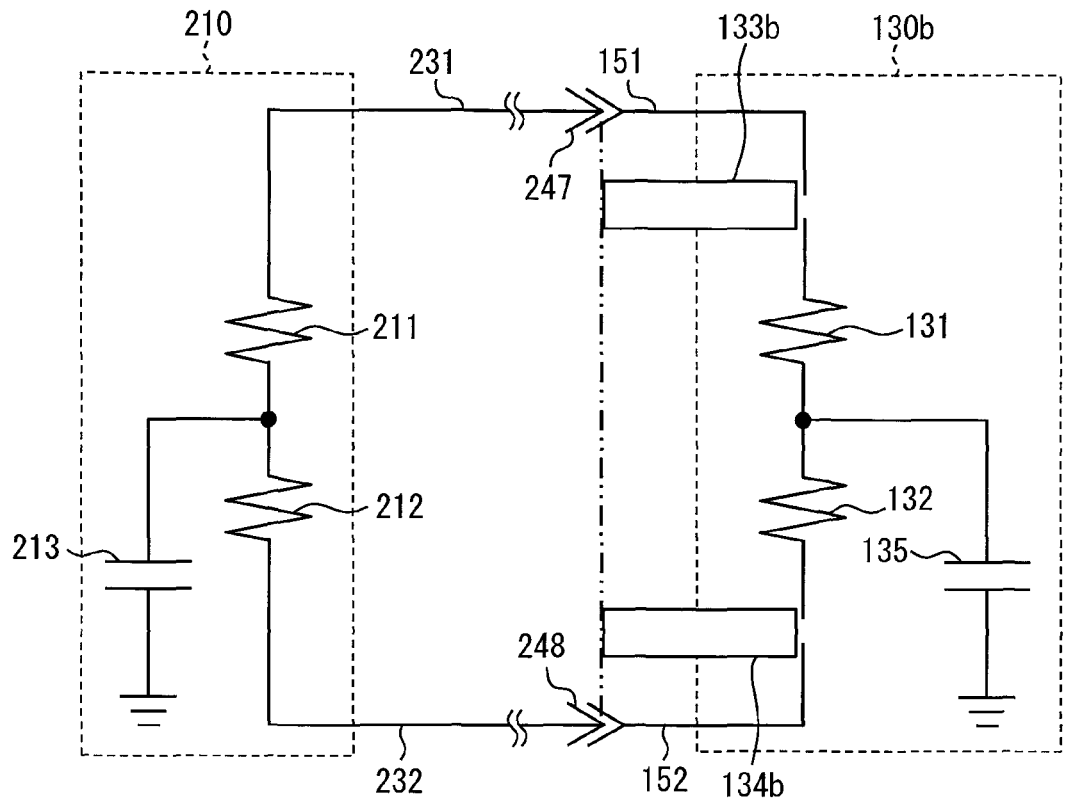
FIG. 12 is a circuit diagram showing generally the charging station and the first terminal circuit in a state that the charging station is connected in a second modified embodiment.

A vehicle control system according to a second modified embodiment will be described with reference to FIG. 12. The second modified embodiment is different from the embodiment described above in the structure of the changeover member. Accordingly, the description of the second modified embodiment will be simplified by identifying the same structural members as in the above-described embodiment with the same reference symbols.

In the second modified embodiment, the changeover member is provided in a first terminal circuit 130b. Thus the second modified embodiment is different in that the first terminal circuit 130b is configured differently from the first terminal circuit 130.

The first terminal circuit 130b is provided with a first changeover switch 133b and a second changeover switch 134b, which are mechanical switches made of conductive materials. The first changeover switch 133b and the second changeover switch 134b are located to be able to be pressed by the charging plug 240, when the charging plug 240 is connected to the charging part 100b. That is, the first changeover switch 133b and the second changeover switch 134b are configured to be able to be pressed by the charging plug 240, which is a part of the charging cable 230. The first changeover switch 133b and the second changeover switch 134b correspond to changeover members.

The first changeover switch 133b and the second changeover switch 134b are disconnected from the first terminal resistor 131 and the second terminal resistor 132 by resilient members such as springs, respectively, and in the off-states, when not pressed by the charging plug 240. Thus the first changeover switch 133b and the second changeover switch 134b are configured to disconnect both of the first terminal resistor 131 and the second terminal resistor 132 from the second high-potential-side line 151 and the second low-potential-side line 152.

The first changeover switch 133b and the second changeover switch 134b are connected electrically to the first terminal resistor 131 and the second terminal resistor 132 by resilient deformation of the resilient members and in the on-states, respectively, when the first changeover switch 133b and the second changeover switch 134b are pressed by the charging plug 240. Thus the first changeover switch 133b and the second changeover switch 134b are configured to connect both of the first terminal resistor 131 and the second terminal resistor 132 to the second high-potential-side line 151 and the second low-potential-side line 152. That is, the first terminal circuit 130b is provided with the changeover members, which mechanically validate and invalidate the first terminal circuit 130b.

The first changeover switch 133b and the second changeover switch 134b are pressed by the charging plug 240 and turned on to validate the first terminal circuit 130b, when the charging plug 240 is connected to the charging port 100b. The first changeover switch 133b and the second changeover switch 134b validate the first terminal circuit 130b at time t1 in FIG. 11.

The first changeover switch 133b and the second changeover switch 134b are not pressed by the charging plug 240 and are turned off to invalidate the first terminal circuit 130b, when the charging plug 240 is not connected to the port 100b. The first changeover switch 133b and the second changeover switch 134b invalidate the first terminal circuit 130b at time t14 in FIG. 11. The second modified embodiment can provide the similar advantage as the first modified embodiment.

Third Modified Embodiment

Figure 13:
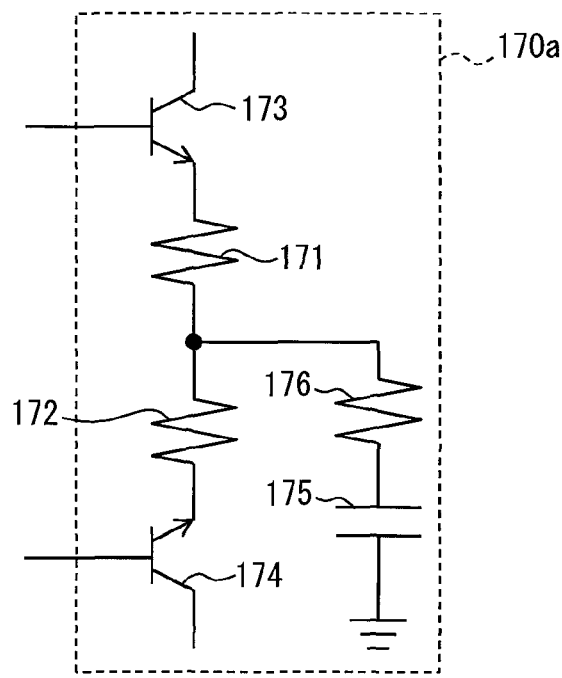
FIG. 13 is a circuit diagram showing generally the second terminal circuit in a third modified embodiment.

An in-vehicle control system according to a third modified embodiment is provided with a second terminal circuit 170a, which includes a filtering resistor 176 as a noise-filtering element in addition to the second capacitor 175, as shown in FIG. 13. In the second terminal circuit 170a, the second capacitor 175 and the filtering resistor 176 are connected in series. It is noted that each of the first terminal circuit 130 and the third terminal circuit 180 may also include the second capacitor 175 and the filtering resistor 176.

Fourth Modified Embodiment

Figure 14:
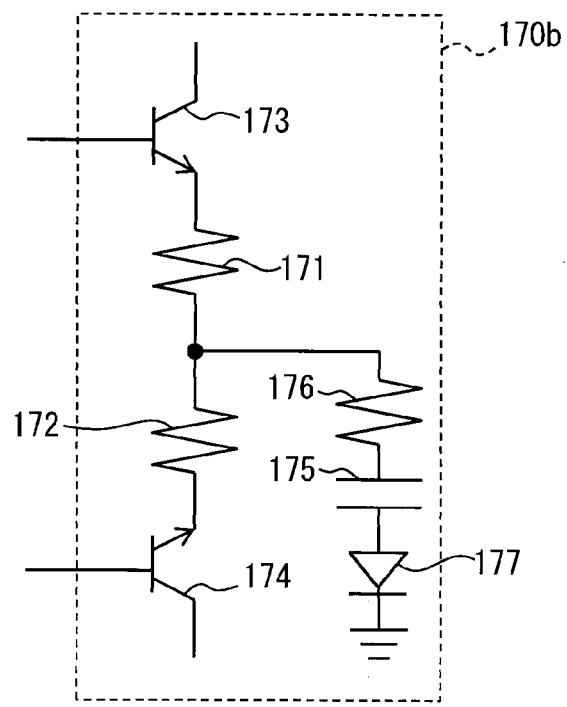
FIG. 14 is a circuit diagram showing generally the second terminal circuit in a fourth modified embodiment.

An in-vehicle control system according to a fourth modified embodiment is provided with a second terminal circuit 170b, which includes a filtering resistor 176 and a filtering diode 177 as noise-filtering elements in addition to the second capacitor 175, as shown in FIG. 14. In the second terminal circuit 170b, the second capacitor 175, the filtering resistor 176 and the filtering diode 177 are connected in series. It is noted that each of the first terminal circuit 130 and the third terminal circuit 180 may also include the second capacitor 175, the filtering resistor 176 and the filtering diode 177.

Fifth Modified Embodiment

Figure 15:
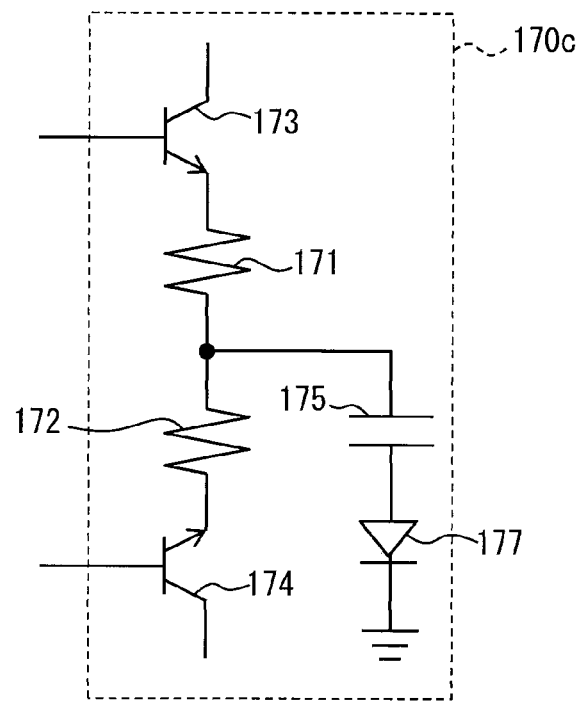
FIG. 15 is a circuit diagram showing generally the second terminal circuit in a fifth modified embodiment.

An in-vehicle control system according to a fifth modified embodiment is provided with a second terminal circuit 170c, which includes a filtering diode 177 as a noise-filtering element in addition to the second capacitor 175, as shown in FIG. 15. In the second terminal circuit 170c, the second capacitor 175 and the filtering diode 177 are connected in series. It is noted that each of the first terminal circuit 130 and the third terminal circuit 180 may also include the second capacitor 175 and the filtering diode 177.

Sixth Modified Embodiment

Figure 16:
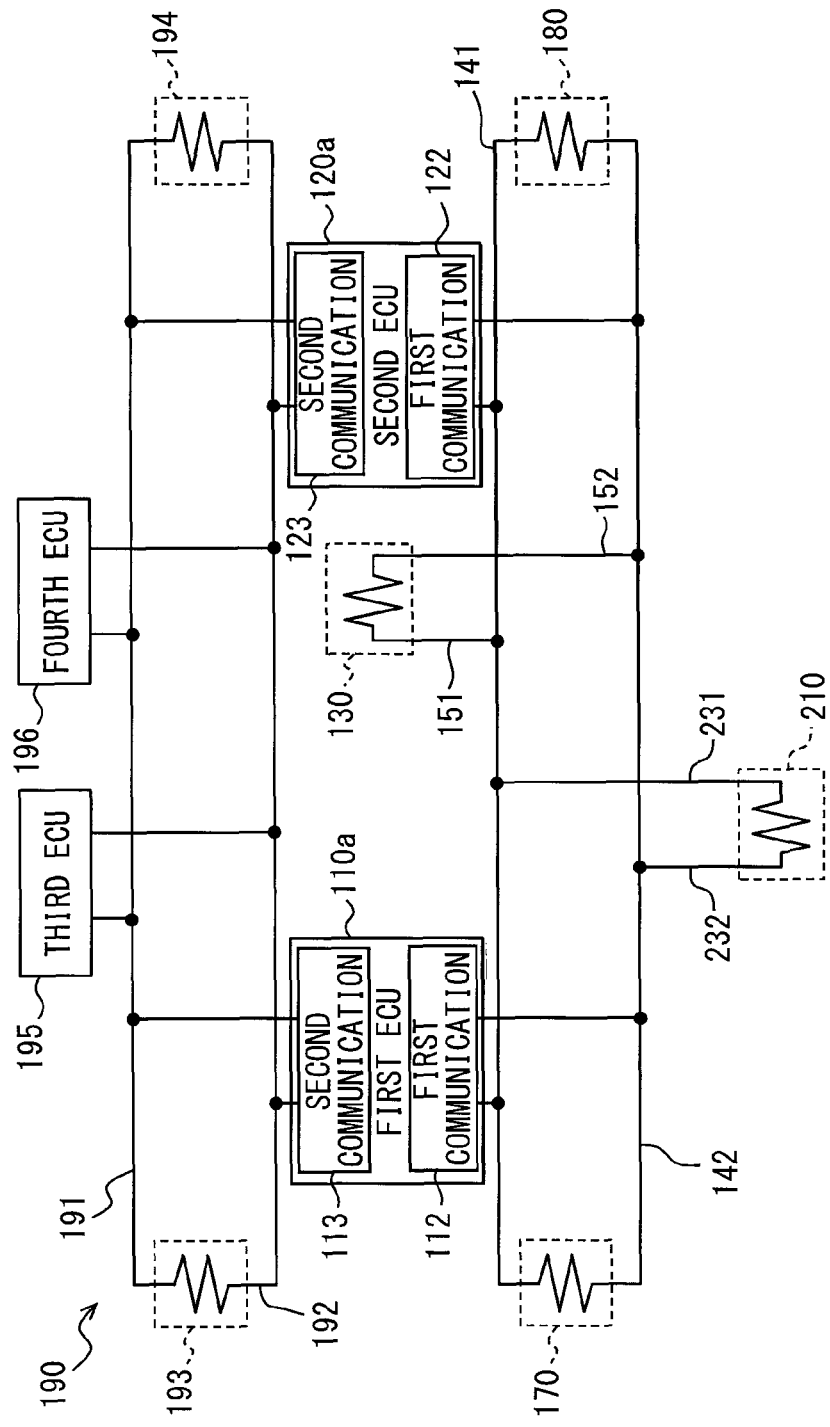
FIG. 16 is a block diagram showing generally an in-vehicle control system in a sixth modified embodiment.

An in-vehicle control system according to a sixth modified embodiment will be described with reference to FIG. 16. The sixth modified embodiment is different from the embodiment described above in that a second in-vehicle network is provided and the first ECU 110 and the second ECU 120a are configured differently. Accordingly, the description of the sixth modified embodiment will be simplified by identifying the same structural members as in the above-described embodiment with the same reference symbols.

The second network 190 includes a double-wire type communication line, which is provided with two terminal circuits 193 and 194. The communication line of the second network 190 corresponds to a second vehicle-side communication line and is formed of a high-potential-side line 191 and a low-potential-side line 192. A third ECU 195 and a fourth ECU 196 are connected to the high-potential-side line 191 and the low-potential-side line 192. The third ECU 195 and the fourth ECU 196 are different from the first ECU 110a and the second ECU 120a and correspond to second electronic devices. Each of the third ECU 195 and the fourth ECU 196 is an electronic control apparatus, which includes a processing circuit, a memory, an input/output circuit, a communication circuit and the like to perform arithmetic processing required for controlling the vehicle 100. In addition to the third ECU 195 and the fourth ECU 196, other electronic devices may be connected to the high-potential-side line 191 and the low-potential-side line 192.

Each of the terminal circuits 193 and 194 may have the same configuration as the first terminal circuit 130 or have a different configuration, in which the first changeover switch 133 and the second changeover switch 134 are removed from the first terminal circuit 130. That is, each of the terminal circuits 193 and 194 may be configured differently as far as it is formed of series-connected two terminal resistors and a capacitor connected to the middle point of the two terminal resistors as a noise-filtering element.

A first ECU 110a is different from the first ECU 110 in that a second communication circuit 113 is provided for performing communication by way of the high-potential-side line 191 and the low-potential-side line 192, in addition to the first communication circuit 112, which performs communication by way of the first communication line 140. Similarly, a second ECU 120a is different from the second ECU 120 in that a second communication circuit 123 is provided for performing communication by way of the high-potential-side line 191 and the low-potential-side line 192, in addition to the first communication circuit 122, which perform communication by way of the first communication line 140.

That is, each of the first ECU 110a and the second ECU 120a is configured to be able to communicate by way of the second in-vehicle network in addition to the above-described communication by way of the in-vehicle network. As a result, each of the first ECU 110a and the second ECU 120a is able to communicate with the third ECU 195 and the fourth ECU 196.

The first ECU 110a and the second ECU 120a are able to communicate by way of the high-potential-side line 191 and the low-potential-side line 192 until the communication between the control circuit 220 and the first ECU 110a starts, when the facility-side communication line is connected to the second communication line 150. That is, the first ECU 110a performs the communication by way of the first communication circuit 112, when the facility-side communication line is not connected to the second communication line 150. The first ECU 110a performs the communication by way of the second communication circuit 113 until the communication with the control circuit 220 starts, when the facility-side communication line is connected to the second communication line 150. Similarly, the second ECU 120a performs the communication by way of the first communication circuit 122, when the facility-side communication line is not connected to the second communication line 150. The second ECU 120a performs the communication by way of the second communication circuit 123 until the communication between the control circuit 220 and the first ECU 110a starts, when the facility-side communication line is connected to the second communication line 150.

The in-vehicle control system according to the sixth modified embodiment can restrict the first ECU 110a and the second ECU 120a from communicating through the communication line, which has four terminal circuits. Thus the in-vehicle control system can assure the quality of communication of the first ECU 110a and the second ECU 120a.

What is claimed is:

1. An in-vehicle control system mounted in a vehicle, which is connectable to a charging facility through a charging cable including a double-wire type facility-side communication line and a charging power cable connected with a facility-side terminal circuit and has a battery chargeable from the charging facility through the charging power cable, the in-vehicle control system comprising:
   a double-wire type vehicle-side communication line connectable to the facility-side communication line and including three vehicle-side terminal circuits;
   plural electronic devices connected to the vehicle-side communication line and capable of communication through the vehicle-side communication line by using a differential voltage, the plural electronic devices including a charging control device capable of communication with the charging facility through the vehicle-side communication line and the facility-side communication line by using the differential voltage; and
   changeover members provided in correspondence to the three vehicle-side terminal circuits and individually validating and invalidating the three vehicle-side terminal circuits, respectively,
   wherein the changeover members validate two of the three vehicle-side terminal circuits and invalidate a remaining one of the three vehicle-side terminal circuits, when the facility-side communication line is disconnected from the vehicle-side communication line, and
   the changeover members validate one of the three vehicle-side terminal circuits and invalidate remaining two of the three vehicle-side terminal circuits, when the facility-side communication line is connected to the vehicle-side communication line.

2. The in-vehicle control system according to claim 1, wherein:
   the vehicle has a charging port, to which the charging cable is connectable;
   one of the three vehicle-side terminal circuits is a charging port terminal circuit, which is located at a position closer to the charging port than positions of connection of the plural electronic devices in the vehicle-side communication line;
   the changeover members invalidate the charging port terminal circuit and validate remaining two of the three vehicle-side terminal circuits, when the facility-side communication line is disconnected from the vehicle-side communication line; and
   the changeover members validate the charging port terminal circuit and invalidate remaining two of the three vehicle-side terminal circuits, when the facility-side communication line is connected to the vehicle-side communication line.

3. The in-vehicle control system according to claim 1, wherein:
   at least one of the plural electronic devices commands each of the changeover members to validate and invalidate the vehicle-side terminal circuits based on whether the facility-side communication line is connected to the vehicle-side communication line.

4. The in-vehicle control system according to claim 3, wherein:
   at least one of the plural electronic devices commands validation of one of the three vehicle-side terminal circuits and invalidation of remaining two of the three vehicle-side terminal circuits before the charging facility and the charging control device start communication, when the facility-side communication line is connected to the vehicle-side communication line.

5. The in-vehicle control system according to claim 1, further comprising:
   plural second electronic devices different from the plural electronic devices;
   a second vehicle-side communication line, which is a double-wire type and different from the vehicle-side communication line, and to which the plural second electronic devices are connected;
   the plural electronic devices include a first communication circuit for communication through the vehicle-side communication line and a second communication circuit for communication through the second vehicle-side communication line; and
   the second communication circuit is used to perform communication through the second vehicle-side communication line until the charging facility and the charging control device start to communicate, when the facility-side communication line is connected to the vehicle-side communication line.

6. The in-vehicle control system according to claim 2, wherein:
   the changeover member, which validates and invalidates the charging port terminal circuit, is a mechanically-operable member;
   the mechanically-operable member validates the charging port terminal circuit by being pressed by the charging cable, when the charging cable is connected to the charging port; and
   the mechanically-operable member invalidates the charging port terminal circuit by being released from pressing of the charging cable, when the charging cable is disconnected from the charging port.

7. The in-vehicle control system according to claim 1, wherein:
   the vehicle-side terminal circuit includes two terminal resistors connected in series, and a noise-filtering element connected to a middle point between the two terminal resistors;
   the changeover members connect the two terminal resistors and the noise-filtering element to the vehicle-side communication line, when the vehicle-side terminal circuit is validated; and
   the changeover members disconnect the two terminal resistors and the noise-filtering element from the vehicle-side communication line, when the vehicle-side terminal circuit is invalidated.

* * * * *